Nov. 2, 1965     C. E. JOHNSON     3,215,369
DUAL MISSION PROPULSION SYSTEM
Filed May 9, 1963     2 Sheets-Sheet 1

INVENTOR.
CARROLL E. JOHNSON
BY Ronald W. Mayes
ATTORNEY.

Nov. 2, 1965  C. E. JOHNSON  3,215,369

DUAL MISSION PROPULSION SYSTEM

Filed May 9, 1963  2 Sheets-Sheet 2

INVENTOR.
CARROLL E. JOHNSON
BY Ronald W. Mayes
ATTORNEY

United States Patent Office 3,215,369
Patented Nov. 2, 1965

1

3,215,369
DUAL MISSION PROPULSION SYSTEM
Carroll E. Johnson, Fort Worth, Tex., assignor to The Boeing Company, Wichita, Kans., a corporation of Delaware
Filed May 9, 1963, Ser. No. 279,092
9 Claims. (Cl. 244—15)

This invention relates to aircraft and to propulsion systems therefor. More particularly this invention relates to an aircraft and a propulsion system therefor having an STOL, short takeoff and landing capability.

An object of this invention is to provide a novel aircraft propulsion system for augmenting the thrust of an aircraft gas generating power plant, especially during takeoff and landing of an aircraft.

A still further object of this invention is the provision of a novel dual mission propulsion system suitable for making it possible for a high performance aircraft to have a STOL capability and/or a loitering mission capability.

Another object of this invention is the provision of a novel propulsion system for providing an aircraft with an operating capability to either loiter or to fly at supersonic speeds, wherein the aircraft can have a variable sweep wing capability.

A still further object of this invention is the provision of a novel aircraft propulsion system comprising a pair of symmetrically and oppositely disposed large propelling fans that are driven by exhaust gases from a remotely located main gas generator and having an augmentation ratio that is substantially equivalent to that of a turboprop type propulsion system at a low speed range, the fans being retractable and stored for normal flight or extended to a desired STOL propulsion augmentation position.

A still further object of this invention is the provision of a dual mission propulsion system comprising a pair of fans that can be swiveled outwardly and forwardly from wells in an aircraft fuselage into a selected thrust position to provide a high thrust augmentation for short takeoff and landing, STOL capability.

The invention further resides in certain novel features of construction, combinations, and arrangements of parts, and further objects and advantages of the invention will be apparent to those skilled in the art to which it pertains from the following description of the present preferred embodiment thereof described with reference to the accompanying drawings, which form a part of this specification, wherein the same reference numerals indicate corresponding parts throughout the several views, and in which.

Figure 1:
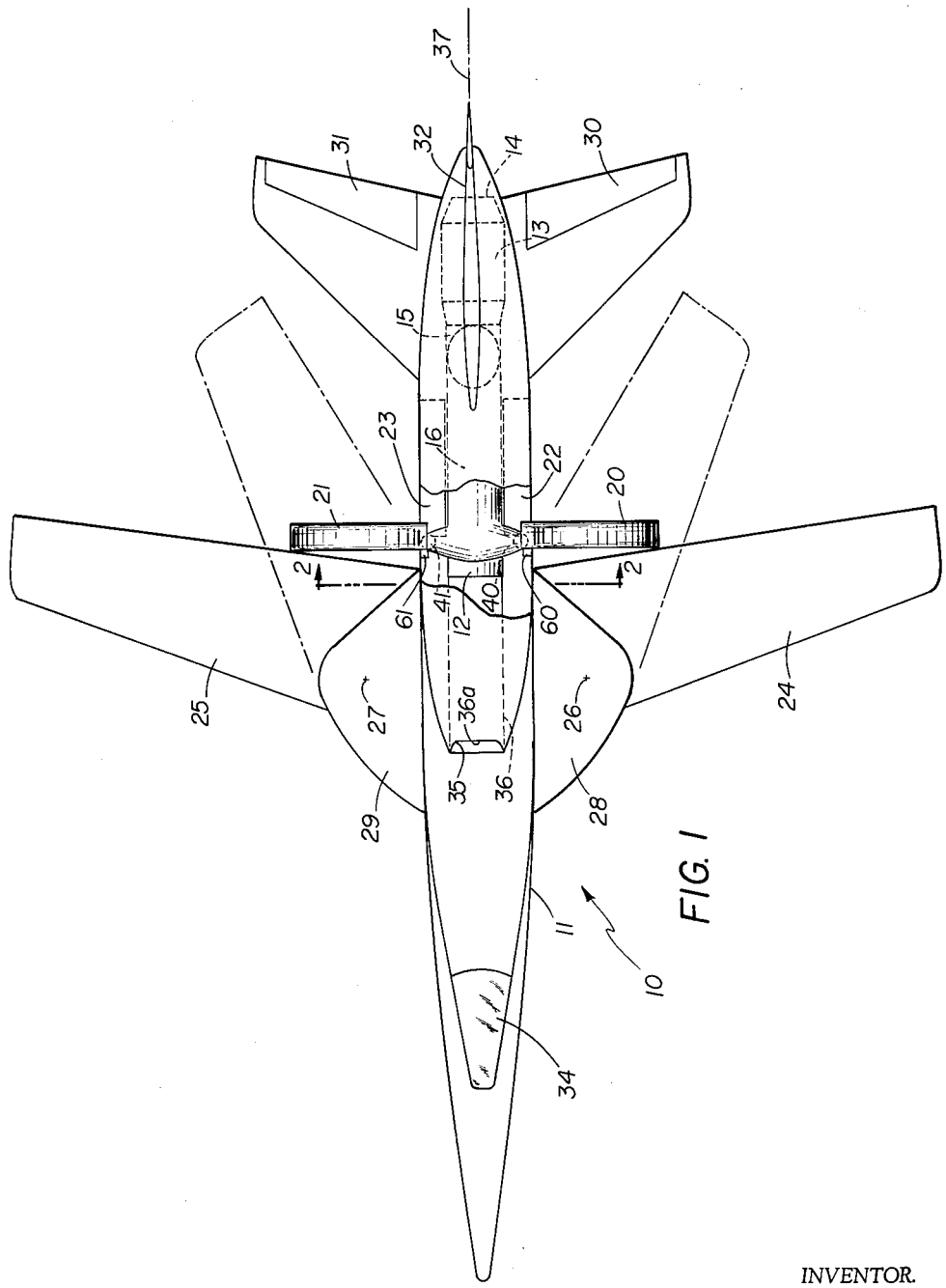
FIG. 1 is a top plan view of a dual mission aircraft embodying the invention and showing variable sweep wings and retractable thrust augmentation fans in fully extended loitering or STOL position, the fans and wings are rearwardly retractable as shown by the hidden lines.

It is to be understood that the invention is not limited to the details of construction and arrangements of parts shown in the drawings and hereinafter described in detail, but is capable of being otherwise embodied and of being practiced and carried out in various ways. It is to be further understood that the terminology employed herein is for the purpose of description and there is no intention to herein limit the invention beyond the requirements of the prior art.

Figure 4:
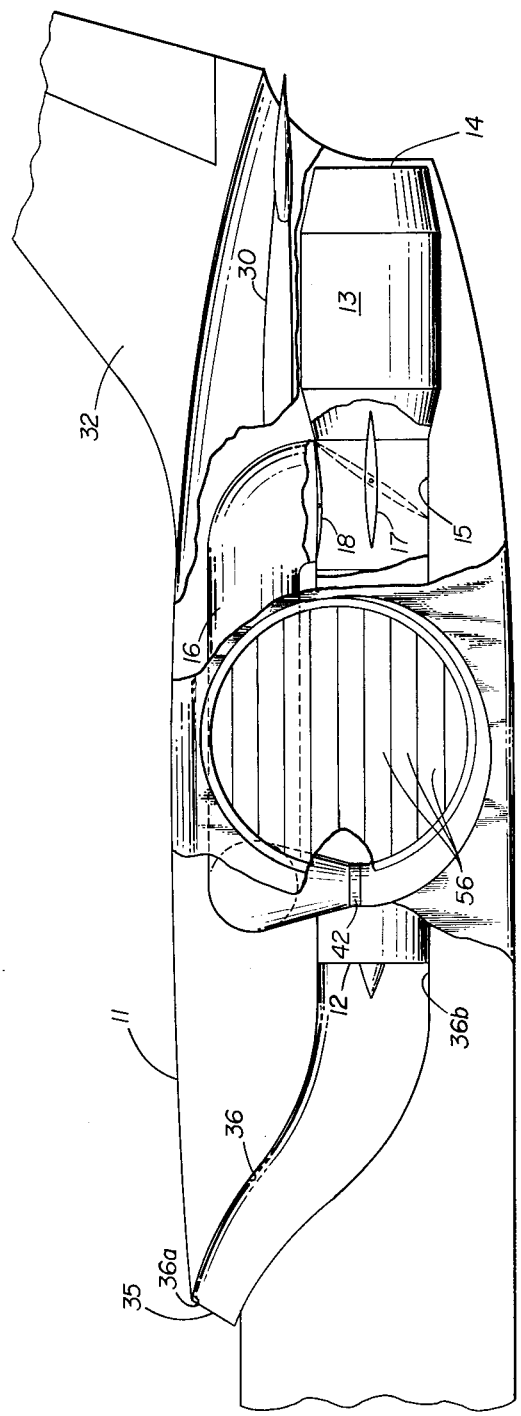
FIG. 4 is an enlarged fragmentary side elevational view of FIG. 1 but with the fans being retracted for supersonic flight, the fuselage and the propulsion system being broken away and partly in section to show details thereof.

Referring to FIG. 1, reference numeral 10 indicates generally a dual mission aircraft having a short takeoff and landing, STOL, capability, and an operational capability in a supersonic speed range. The aircraft has a fuselage 11 housing a conventional aircraft turbine or jet-type power plant 12 equipped with an enlarged cylindrical afterburner 13 and an exhaust nozzle 14. The jet engine 12 as seen in FIG. 4 has a cylindrical intermediate exhaust section 15 and a cylindrical overhead bypass feedback duct arrangement 16 respectively controlled by a pair of butterfly or flap valves 17 and 18 operable in a manner to be described. The valves 17, 18 may be referred to as dampers inasmuch as they are similar in construction to stovepipe dampers and are pivotably mounted at the lateral rod ends thereof. Preferably, synchronous motors, not shown, are geared to the rod ends of the valves 17, 18 for controlling the positions of the same. The feedback duct arrangement 16 conducts exhaust gases to a pair of propelling fans 20 and 21, when the fans are in STOL position. The fans 20 and 21 fold back into similarly shaped wells 22 and 23 formed in opposite sides of the fuselage 11 when the fans 20, 21 are folded back, the valves 17 and 18 are horizontal, FIG. 4, so that all of the products of combustion from the engine 12 exhaust through the afterburner 13 and the nozzle 14.

The aircraft 10 has a pair of retractable wings 24 and 25 pivotally connected at points 26 and 27 to symmetrically disposed wing root platforms 28 and 29 fixed to opposite sides of the aircraft. The wings 24 and 25 can be retracted and swept back as shown by hidden lines in FIG. 1 for supersonic flight. In addition to the swept back wings 24 and 25, the aircraft 10 has horizontal stabilizer and elevator assemblies 30 and 31 and a vertical stabilizer and rudder assembly 32 fixed to the aft end of the fuselage 11 in a conventional manner. It will be noted however that the horizontal stabilizer and elevator assemblies 30 and 31 are fixed to the fuselage 11 at a water line above the duct section 15, the afterburner 13, and the nozzle 14.

A pilot's cockpit 34 is spaced ahead of an air intake duct 35. The duct 35 is located atop of the fuselage 11 in an area above the wing support platforms 28 and 29 for ducting atomspheric air to the jet engine 12 via a downwardly and rearwardly inclined streamlined duct 36. The duct 36 has a center line lying in a vertical plane coincidental with the central longitudinal axis 37 of the aircraft fuselage 11, FIG. 1. The duct 36 has a small intake end 36a and an enlarged end 36b connecting with the intake and compressor end of the turbine 12.

The front end of the turbine 12 is located behind the center of gravity C.G. of the aircraft 10. The engine 12, the duct 15, the afterburner 13 and the nozzle 14 have a center line coincidental with the longitudinal axis 37 of the aircraft. The valve 17 has a horizontal axis intersecting the axis 37 at a right angle. The valve 18 has a horizontal axis parallel to the axis of the valve 17 and located in the elliptically-shaped entranceway to the duct 16.

Figure 2:
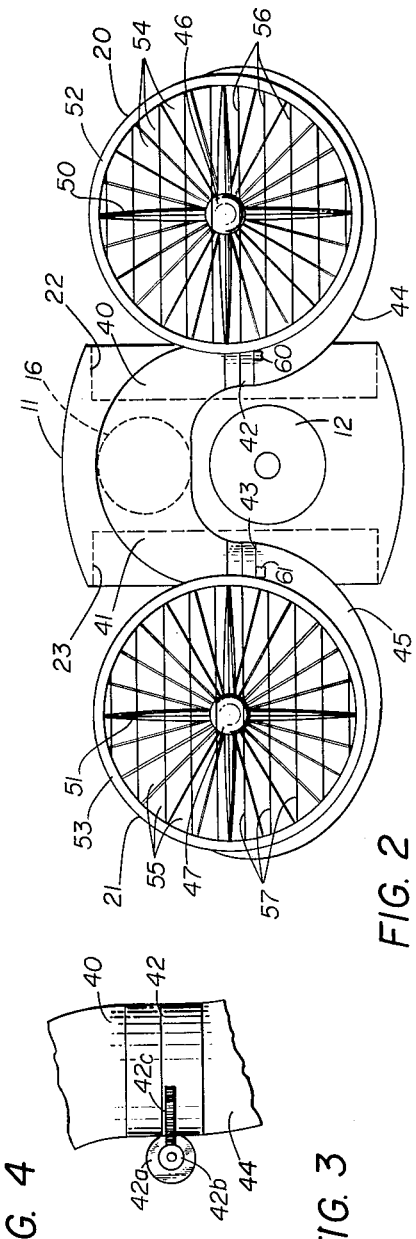
FIG. 2 is a section view along line 2—2 of FIG. 1.

The valves 17 and 18 are inclined or tilted away from their normal horizontal positions, FIG. 4, to duct the exhaust gases into the feedback duct 16 for driving the fans 20 and 21 when the same are extended. STOL thrust is produced when the fans 20 and 21 are laterally extended outwardly from their normally retracted positions, as shown in FIGS. 1 and 2.

Figure 3:
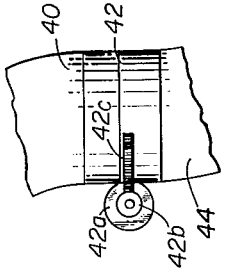
FIG. 3 is an enlarged fragmentary detail view of synchronous drive motor and gear means for extending and retracting the fans.

The overhead feedback duct 16 terminates in a pair of outlet ducts 40 and 41 that extend laterally outwardly in opposite directions and downwardly into a substantially horse-shoe-shaped configuration, FIG. 3. The exhaust gases are ducted through the outlet ducts 40 and 41 through a pair of joints indicated generally by reference numerals 42 and 43. The joints 42, 43 are located behind the C.G. of the aircraft 10 and behind the front end of the turbine 12. The joints 42, 43 are located laterally of the axis 37 but inside of the outer contour lines of the fuselage 11 and slightly above the axis 37. The fans 20, 21 have lower edges disposed immediately behind and below the wings 24, 25 when in extended position for augmenting wing lift. When the wings 24, 25 are retracted, the fans 20, 21 are also retracted. If desired, one may use the "Control Mechanism" of Ronald T. Peterson's copending application Serial Number 267,626 filed March 25, 1963, to sequentially control extension and retraction of the wings 24, 25 and the fans 20, 21. The joints 42, 43 are conventional ball bearing thrust joints strong enough for supporting the entire structures of the fans 20, 21. A synchronous motor 42a drives a worm 42b, FIG. 3. The worm 42b is meshed with an annular drive gear 42c fixed to the turnable portion of the joint 42 carried by the outlet duct 44. A suitable drive and sealed thrust bearing joint are shown in the aforementioned copending United States patent application. The joint 43 has a similar drive arrangement. If desired, other known drive arrangements may be used. The motors controlling the positioning of the valves 17, 18 and the fans 20, 21, if desired, may be controlled by a master switch and/or individually controlled by separate switches in a known manner.

From the joints 42, 43, the exhaust gases are ducted through a pair of horn-shaped gas distribution ducts 44 and 45 to the tips of the fans 20 and 21, respectively. The ducts 40, 44 and 41, 45 have the appearance of ram's horns as seen in FIG. 2. The fans 20 and 21 are respectively supported by central hubs 46 and 47 journaled in internal struts 50 and 51 that are respectively fixed into cowlings 52 and 53 of the fans 20 and 21. The cowlings 52 and 53 are circular and provide conventional means for directing hot exhaust gases against the tips of the fan blades 54 and 55 of the fans 20 and 21. Accordingly, the fan blades 54 and 55 are tip propelled by the hot exhaust gases. The tip structure of the fan blades 54, 55 and associated structures are not shown because any of several conventional configurations can be adopted whichever one is considered the most suitable or desirable.

Horizontal louvers or flaps, indicated generally by the reference numerals 56, 57, are provided to cover the cowlings 52, 53, respectively. The cover louvers 56, 57 are respectively pivotally connected at the ends thereof, not shown, inside the cowlings 52, 53. When the fans 20, 21 are retracted, FIG. 4, the louvers 56, 57 lie flat and provide a streamlined cover for the fans 20, 21 in the wells 22, 23. The louvers 56, 57 can be freely pivoted to hang down due to gravity in retracted position. The louvers 56, 57 are forced open due to intake of air when the flaps are extended. Alternatively, the louvers 56, 57 can be positively actuated to opened position or closed position by known louver actuating means. The louvers can be omitted if desired, but increased drag will result.

The fans 20, 21 can be used to assist the synchronous motor drive arrangements for the joints 42, 43, FIG. 2, when it is desired to extend the fans 20, 21 as shown in FIG. 1. The valves 17, 18 are tilted slightly in a counterclockwise direction to accomplish this maneuver. If the fans 20, 21 drive the synchronous motors, then the motors act as eddy current brakes. Stops 60, 61 prevent the fans 20, 21 from being driven past the desired extended position for short takeoff or loitering flight. If desired, the stops 60, 61 can be made adjustable. The stops 60, 61 transmit forward thrust from the fans 20, 21 to the frame of the fuselage 11 behind the wings 24, 25 and the mounting supports of the engine 12.

The slipstream acting against the fans 20, 21 or the aerodynamic drag thereof can be used to assist the synchronous motors in retracting the fans 20, 21 into the fuselage wells 22, 23. If the aerodynamic drag forces are too great against the fans 20, 21, the synchronous motors will act as eddy current brakes. Suitable stop and fastening means, not shown, are used to secure the fans 20, 21 in the wells 22, 23, respectively.

It will be understood that this invention can be modified to adapt it to various circumstances and conditions, and it is accordingly desired to comprehend within the purview of this invention such modifications as may be considered to fall within the scope of the appended claims.

What is claimed is:
1. In an aircraft,
a propulsion system generating exhaust gases,
a fuselage having wells formed therein,
a pair of oppositely disposed fans pivotally connected to either side of said fuselage for generating forward thrust,
means for extending said fans forwardly and laterally outwardly and for retracting said fans rearwardly and inwardly into said fuselage wells, and
duct means ducting exhaust gases from said propulsion system to said fans for driving the same.

2. In an aircraft,
a fuselage,
gas generating means carried by said fuselage and exhausting gas through a nozzle for providing forward propulsion,
gas driven fan means connected to said fuselage in such a position as to generate forward thrust,
duct means ducting gas from said gas generating means to said gas driven fan means, and
valve means for diverting gas away from said nozzle to said gas driven fan means.

3. In an aircraft,
a fuselage,
movable wing means connected to said fuselage,
a power plant connected to said fuselage,
propeller means connected to said fuselage and extending laterally outwardly in a forward thrust generating position behind the trailing edge of said wing means when the same are moved to a predetermined position in such a manner as to increase the lift of said wing means when forward thrust is generated, and
means for transmitting power from said power plant to said propeller means when said wing means are in said predetermined position and said propeller means are extended.

4. In a vehicle,
a body,
a power plant carried by said body,
propeller means,
propeller support means supporting said propeller means,
means pivotally connecting said propeller support means to said body,
means transmitting power from said power plant to said propeller means, and
means for turning said propeller support means about said pivotal support means for extending said propeller support means and said propeller means laterally outwardly into a forward thrust generating position and for retracting said propeller support means and said propeller means rearwardly during flight.

5. In a vehicle,
a body,
stationary power plant means generating hot gas,
propeller means driven by hot gas from said power plant means,
propeller support means pivotally connected to said body and supporting said propeller means, and
drive means for extending said propeller support means laterally away from said body into a forward thrust generating position, and said drive means being reversible for retracting said propeller support means back toward said body.

6. In an aircraft,
a fuselage,
wing means connected to said fuselage,
nozzle means in the aft end of said fuselage,
gas generating means in said fuselage adapted to exhaust gas through said nozzle means rearwardly of said fuselage for generating a forward thrust,
thrust augmentation means for generating forward thrust connected to said fuselage, said thrust augmentation means when in operative position being located behind the trailing edge of said wing means in such a manner as to increaes the lift thereof,
duct means ducting gas from said gas generating means to said thrust augmentation means,
valve means for diverting any desired portion of said gas from said gas generating means into said duct means and to said thrust augmentation means,
means for extending and retracting said thrust augmentation means respectively away from and into said fuselage when the aircraft is in flight, and
louver means for enclosing said thrust augmentation means when retracted in said fuselage.

7. In an aircraft,
a fuselage,
wing means connected to said fuselage,
nozzle means in the aft end of said fuselage,
gas generating means in said fuselage adapted to exhaust gas through said nozzle means rearwardly of said fuselage for generating a forward thrust,
thrust augmentation means for generating forward thrust connected to said fuselage, said thrust augmentation means when in operative position being located behind the trailing edge of said wing means in such a manner as to increase the lift thereof,
duct means ducting gas from said gas generating means to said thrust augmentation means,
valve means for diverting gas from said gas generating means into said duct means and to said thrust augmentation means, and
means for retracting said thrust augmentation means.

8. In an aircraft,
a fuselage,
wing means connected to said fuselage,
nozzle means in the aft end of said fuselage,
gas generating means in said fuselage adapted to exhaust gas through said nozzle means rearwardly of said fuselage for generating a forward thrust,
thrust augmentation means for generating forward thrust connected to said fuselage,
duct means ducting gas from said gas generating means to said thrust augmentation means, and
means for retracting said thrust augmentation means into said fuselage.

9. In an aircraft,
a fuselage,
gas generating means in said fuselage,
thrust augmentation means for generating forward thrust connected to said fuselage and being extendable and retractable when the aircraft is in flight,
duct means ducting gas from said gas generating means to said thrust augmentation means, and
valve means for diverting any desired portion of said gas from said gas generating means into said duct means and to said thrust augmentation means.

References Cited by the Examiner
UNITED STATES PATENTS

| | | | |
|---|---|---|---|
| 1,868,832 | 7/32 | Henter | 244—65 X |
| 2,076,398 | 4/37 | Carden | 244—55 |
| 2,506,976 | 5/50 | Tharratt | 244—58 X |
| 3,033,492 | 5/62 | Rowe | 244—23 |
| 3,053,484 | 9/62 | Alford | 244—46 X |
| 3,080,137 | 3/63 | Hurel | 244—12 |
| 3,084,888 | 4/63 | Hertel | 244—23 |

FOREIGN PATENTS 330,223  12/20  Germany.

FERGUS S. MIDDLETON, *Primary Examiner.*
R. DAVID BLAKESLEE, MILTON BUCHLER,
*Examiners.*